(12) United States Patent
Nakayama et al.

(10) Patent No.: US 6,811,002 B2
(45) Date of Patent: Nov. 2, 2004

(54) DISC BRAKE

(75) Inventors: Shinichi Nakayama, Yamanashi-ken (JP); Satoru Tsurumi, Yamanashi-ken (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 10/648,327

(22) Filed: Aug. 27, 2003

(65) Prior Publication Data

US 2004/0112689 A1 Jun. 17, 2004

(30) Foreign Application Priority Data

Sep. 25, 2002 (JP) .......................... 2002-279455
Mar. 31, 2003 (JP) .......................... 2003-095618

(51) Int. Cl.⁷ .............................................. F16D 65/56
(52) U.S. Cl. ..................................... 188/71.9; 188/72.8
(58) Field of Search ............................ 188/71.7, 71.8, 188/71.9, 72.7, 72.8, 72.9

(56) References Cited

U.S. PATENT DOCUMENTS

| | | | | |
|---|---|---|---|---|
| 3,809,189 A | * | 5/1974 | Farr ........................... | 188/71.9 |
| 3,920,103 A | * | 11/1975 | Haraikawa .................. | 188/71.9 |
| 3,934,684 A | * | 1/1976 | Evans ......................... | 188/71.9 |
| 4,512,445 A | * | 4/1985 | Runkle et al. ............. | 188/71.9 |
| 4,596,315 A | * | 6/1986 | Takeuchi et al. ........... | 188/71.9 |

FOREIGN PATENT DOCUMENTS

| JP | 56-168633 | 5/1980 |
|---|---|---|
| JP | 2002-364689 | 12/2002 |

* cited by examiner

*Primary Examiner*—Chris Schwartz
(74) *Attorney, Agent, or Firm*—Wenderoth, Lind & Ponack, L.L.P.

(57) ABSTRACT

The present invention provides a disc brake with an integral parking brake, in which a push rod, a push rod biasing member and a spring cover are formed into an assembly in the form of a single cartridge. The push rod is divided into two separate bodies, namely, a front body portion threadably engaged with a clutch member and a rear body portion engaged with a cam rod. In this disc brake, it is possible to prevent a loss of an output force of a piston under a high fluid pressure. There is no need to increase a diameter of a piston for compensating for such a loss of an output force of a piston, and a reduction in size of a disc brake can be achieved.

9 Claims, 13 Drawing Sheets

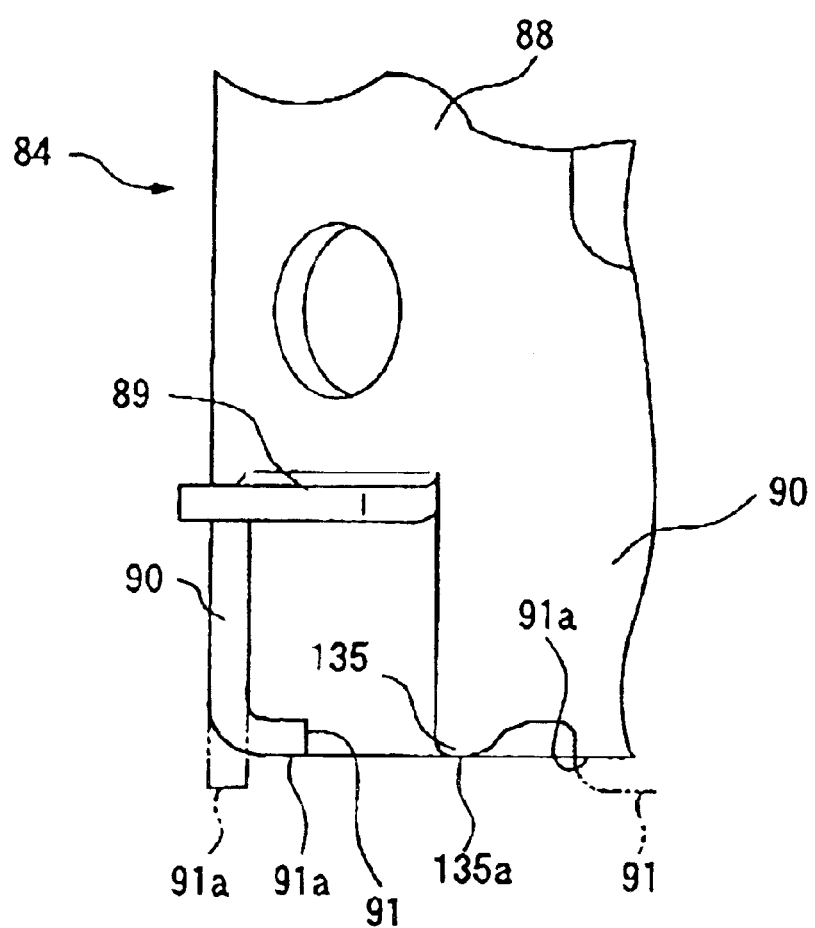

DISC BRAKE

BACKGROUND OF THE INVENTION

The present invention relates to a disc brake with an integral parking brake.

As an example of a disc brake with an integral parking brake, there can be mentioned a disc brake disclosed in, for example, Japanese Patent Application Public Disclosure No. H9-250580, which comprises: a pair of pads disposed on opposite sides of a disc; a caliper including a cylinder having one end closed and a piston slidably fitted within the cylinder, wherein the piston is slidably moved under a brake fluid pressure introduced into an area between the cylinder and the piston to thereby press the pads against the disc; a cam mechanism adapted to be rotated on an axis perpendicular to the axis of the cylinder by operating a parking brake member, to thereby change an amount of projection of a cam rod; a push rod slidably supported in the cylinder and adapted to be slidably moved by being pressed by the cam rod of the cam mechanism; a clutch member threadably engaged with the push rod within the cylinder, which is slidably fitted within and abuts against the piston, wherein the clutch member is adapted to be pressed by the push rod, to thereby positively perform a slidable movement of the piston relative to the cylinder; a push rod biasing member disposed within the cylinder and adapted to bias the push rod towards the cam mechanism; and a spring cover disposed within the cylinder so as to hold the push rod biasing member between the push rod and the spring cover.

In this disc brake, when the parking brake member is operated, the amount of projection of the cam rod of the cam mechanism increases, to thereby move the push rod in the direction of the disc and also move the clutch member and the piston, together with the push rod, in the direction of the disc, thus mechanically pressing the pads against the disc.

In this disc brake in which a brake fluid pressure is introduced into the cylinder during normal braking, there are provided a piston seal for sealing a gap between an outer circumferential surface of the piston and an inner circumferential surface of the cylinder, a clutch member seal for sealing a gap between the piston and the clutch member, and a push rod seal for sealing a gap between the push rod and the cylinder.

When a brake fluid pressure is introduced into the cylinder in order to enable the piston to advance in the direction of the disc, the fluid pressure acts to thrust the piston in the direction of the disc. The clutch member, together with the piston, also thrusts in the direction of the disc until a built-in clearance provided between the clutch member and the push rod becomes zero (i.e., the clutch member engages the push rod).

If the piston continues to move in the direction of the disc even after the clearance becomes zero (when a clearance between the disc and the brake pad increases due to wear of the brake pad), abutment surfaces of the piston and the clutch member are separated from each other. In this instance, due to the fluid pressure acting on the clutch member through the clutch member seal provided between the piston and the clutch member, an axial force is generated, and the clutch member moves, while rotating, in the direction of the disc. Consequently, the abutment surfaces of the piston and the clutch member abut against each other again. This action is a so-called adjustment function which is performed to maintain a predetermined clearance between the disc and the brake pad.

If the brake fluid pressure is further increased and reaches a predetermined level, the clutch member is forced against the piston due to the brake fluid pressure acting on the clutch member. Therefore, the clutch member does not rotate (the adjustment function is not performed), and moves the push rod in the direction of the disc. Thus, overadjustment in the case of a high fluid pressure being applied to the cylinder can be prevented.

SUMMARY OF THE INVENTION

However, in the above-mentioned disc brake, when a high fluid pressure is applied to the cylinder, the push rod seal provided between the push rod and the cylinder receives a fluid pressure acting in a direction opposite to that of the movement of the piston pressed by the clutch member. Therefore, an output force of the piston decreases due to the fluid pressure acting on the push rod, thus limiting generation of an output force of the piston relative to the operation of the brake pedal. To compensate for such a loss of an output force of a piston, the diameter of a piston is required to be large, resulting in a large size of a disc brake.

Therefore, it is an object of the present invention to reduce the size of a disc brake.

The present invention provides a disc brake comprising: a pair of pads disposed on opposite sides of a disc; and a caliper including a cylinder having one end closed and a piston slidably fitted within the cylinder. The piston is adapted to be slidably moved, to thereby bring the pair of pads into contact with the disc. The disc brake also comprises: a cam mechanism adapted to be rotated to thereby change an amount of projection of a cam rod; a push rod disposed within the cylinder, which is adapted to be pressed and moved by the cam rod; and a clutch member disposed within the cylinder, which abuts against the piston while being threadably engaged with the push rod. The clutch member is adapted to be pressed by the push rod, to thereby positively perform a slidable movement of the piston relative to the cylinder. A push rod biasing member is disposed within the cylinder so as to bias the push rod towards the cam mechanism. Further, a spring cover is disposed within the cylinder, with the push rod biasing member being held between the push rod and the spring cover. In this disc brake, the push rod, the push rod biasing member and the spring cover form an assembly in the form of a single cartridge. The push rod comprises a front body portion threadably engaged with the clutch member and a rear body portion engaged with the cam rod. The front body portion and the rear body portion are separable from each other, with parting surfaces thereof existing in the interior of the cartridge. A radially outer portion of the front body portion of the push rod includes a rotation-preventing portion, which is adapted to restrict rotation of the front body portion and the cylinder relative to each other in a circumferential direction of the cylinder.

The present invention is advantageous in the following point. When a brake fluid pressure is introduced into the cylinder so as to effect advancement of the piston, the fluid pressure acts on the piston, to thereby generate, in the piston, a thrust force acting in the direction of the disc. In this instance, the fluid pressure also acts on the clutch member, so that a thrust force acting in the direction of the disc is also generated in the clutch member. In an initial period of a braking operation, the clutch member axially moves by an amount corresponding to a clearance for engagement provided between the clutch member and the front body portion of the push rod, thus pressing the piston. When the brake fluid pressure is further increased and reaches a predetermined level, the clutch member is forced against the piston due to the fluid pressure acting on the clutch member. Thus, the fluid pressure acts on the piston and the clutch member, so that a thrust force acting in the direction of the disc is generated in the piston and the clutch member. In this instance, the fluid pressure also acts on the rear body portion of the push rod, so that a thrust force acting in a direction opposite to the location of the disc is generated in the rear body portion of the push rod. In the present invention, the push rod is divided into the front body portion and the rear body portion which are separable from each other. Therefore, a clearance is formed between the parting surfaces of the front body portion and the rear body portion, and the thrust force of the rear body portion acting in the direction opposite to the location of the disc can be separated from the thrust force of the front body portion acting in the direction of the disc.

BRIEF DESCRIPTION OF THE DRAWINGS

FIG. 15 is an enlarged side view of a part of a spring cover in the disc brake in the sixth embodiment of the present invention.

DETAILED DESCRIPTION OF THE INVENTION

Hereinbelow, referring to FIGS. 1 to 5, description is made with regard to a disc brake according to a first embodiment of the present invention.

Figure 1:
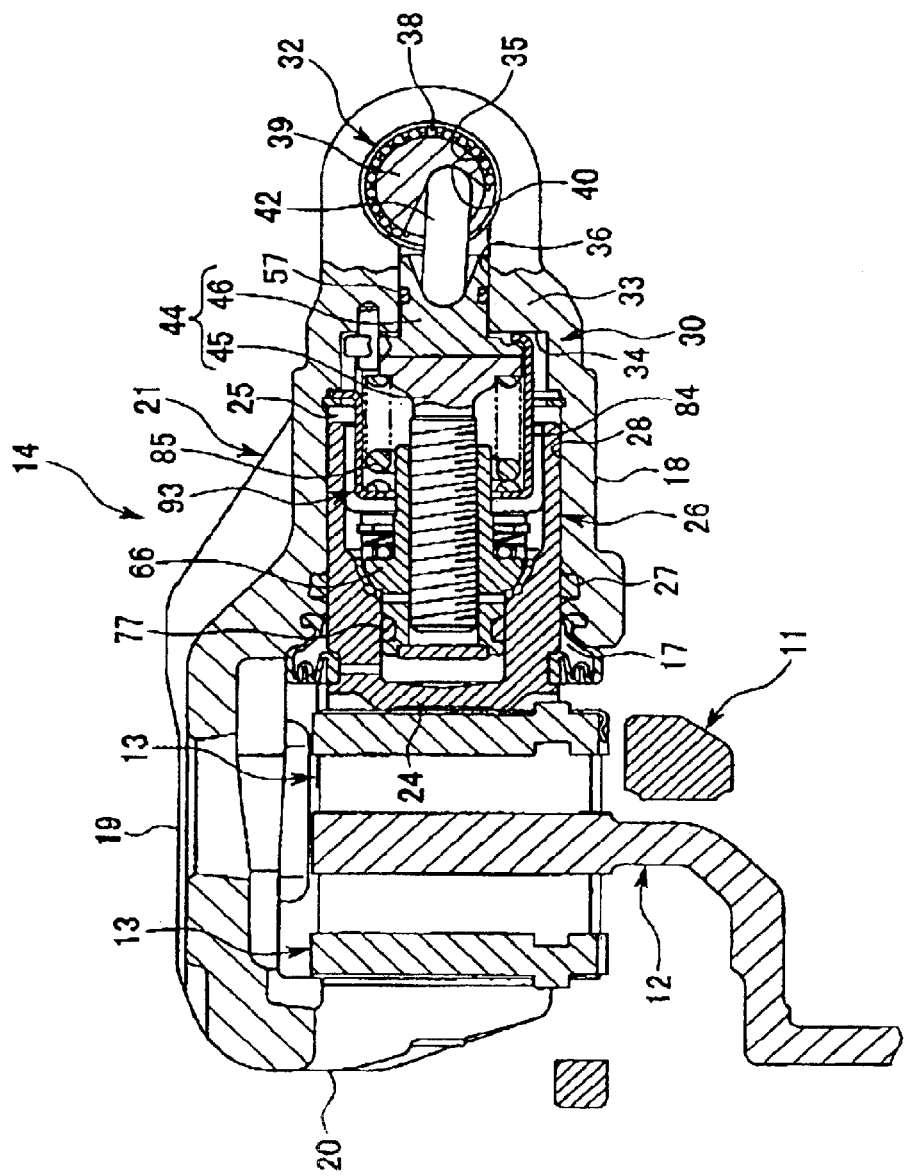
FIG. 1 is a cross-sectional view of a disc brake according to a first embodiment of the present invention.

FIG. 1 shows a disc brake according to the first embodiment of the present invention. The disc brake in this embodiment mainly comprises a carrier 11 fixedly connected to a non-rotatable portion of a vehicle, a pair of pads 13 disposed on opposite sides of a disc 12, which are slidably supported by the carrier 11, and a caliper 14 supported by the carrier 11 so that the caliper 14 is slidable in an axial direction of the disc 12. The pair of pads 13 are held between a claw portion 20 and a piston 26 of the caliper 14, which are described later.

The caliper 14 comprises a caliper body 21. The caliper body 21 includes: a cylinder 18 having one end closed and having an open portion 17 facing a surface of one pad 13 on a side opposite the disc 12; a disc pass portion 19 extending from a radially outer side of the cylinder 18 and passing over the disc 12; and the claw portion 20. The claw portion 20 extends from the disc pass portion 19 on a side opposite the cylinder 18 so as to face a surface of the other pad 13 on a side opposite the disc 12.

The caliper 14 also comprises the piston 26 in the form of a cylinder having one end closed, which is slidably fitted into a bore 25 of the cylinder 18 of the caliper body 21 so that a bottom portion 24 of the piston 26 faces the pad 13. The caliper 14 further comprises a ring-shaped piston seal 27 for sealing a space between the piston 26 and an inner circumferential surface 28 of the cylinder 18. The piston seal 27 is held in the cylinder 18.

In the caliper 14, when a brake fluid pressure is introduced into an area between the cylinder 18 and the piston 26, the piston 26 moves towards one pad 13, to thereby hold the two pads 13 by the piston 26 and the claw portion 20, thus bringing the pads 13 into contact with the disc 12.

Thus, during normal braking effected by depressing a brake pedal, a brake fluid pressure is introduced into the cylinder 18 from a master cylinder (not shown), so that the piston 26 is moved from the cylinder 18 in the direction of the claw portion 20, to thereby press the pads 13 against the disc 12, thus generating a braking force. In the cylinder 18, there is also provided a parking brake mechanism 30. In the parking brake mechanism 30, the piston 26 is moved mechanically, without using a brake fluid pressure, to thereby press the pads 13 against the disc 12, thus generating a braking force.

The parking brake mechanism 30 comprises a cam mechanism 32.

The cam mechanism 32 is provided in a cam opening 35 and a bottom opening 36 formed at a bottom portion 33 of the cylinder 18. The cam opening 35 is formed at a position separated from a bottom surface 34 of the cylinder 18, and extends in a direction perpendicular to the axis of the cylinder 18. The bottom opening 36 opens at a central position of the bottom surface 34 and axially extends to the cam opening 35.

The cam mechanism 32 comprises a generally columnar cam body 39 rotatably provided in the cam opening 35 through bearings 38. The cam body 39 includes a generally V-shaped cam recess 40, which is recessed from a radially outer surface of the cam body 39, the cam recess 40 being deepest at a position offset from the center axis of the cam body 39.

The cam mechanism 32 also comprises a cam rod 42. The cam rod 42 has one end inserted into the cam recess 40 and the other end provided in the bottom opening 36. When the cam body 39 is rotated on an axis perpendicular to the axis of the cylinder 18, the amount of projection of the cam rod 42 from the cam body 39 changes according to the form of the cam recess 40. The cam body 39 is rotated by manually operating a parking brake lever (not shown).

A push rod 44 is provided in the cylinder 18. The push rod 44 is adapted to move in an axial direction of the cylinder 18 by being pressed by the cam rod 42 of the cam mechanism 32.

Figure 2:
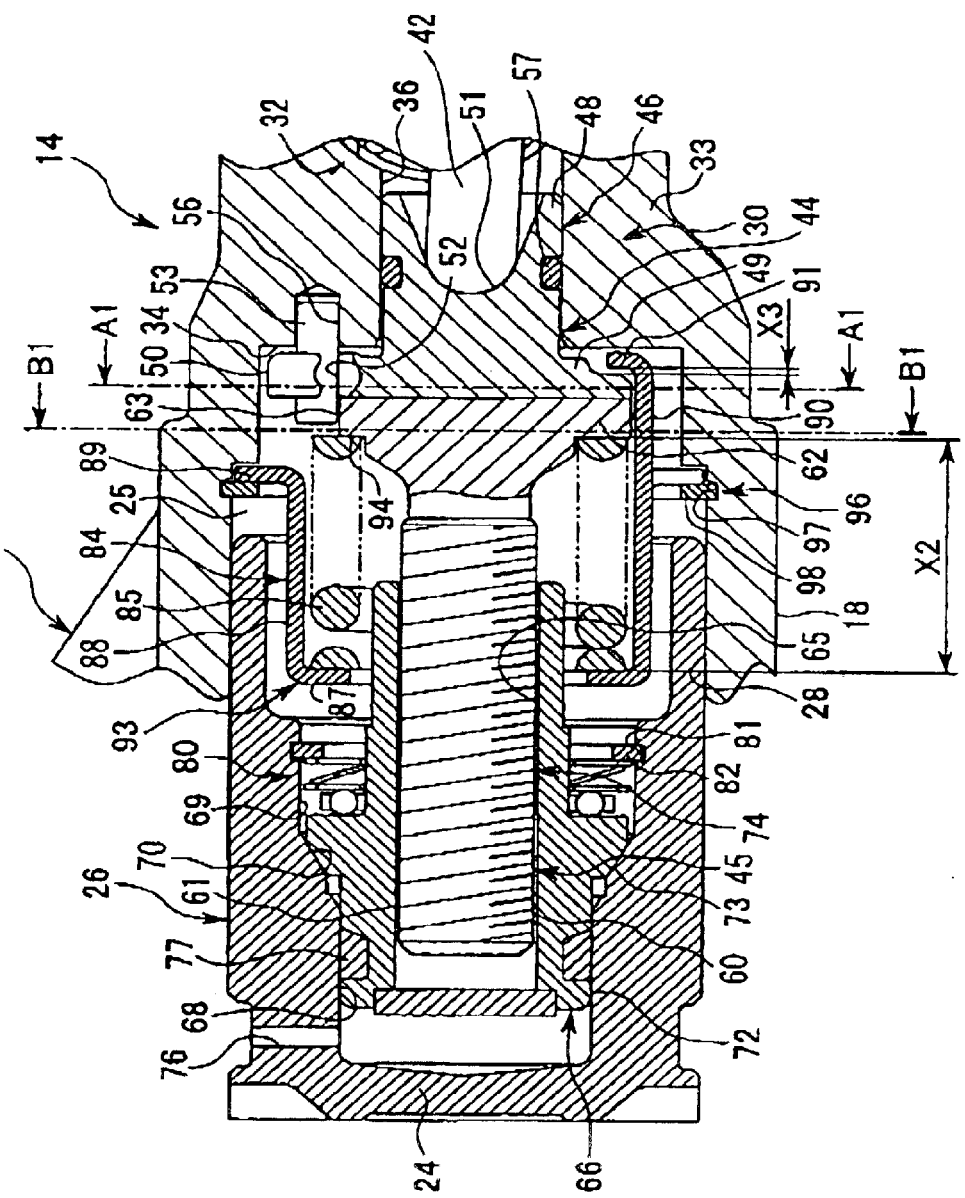
FIG. 2 is a cross-sectional view of an essential part of the disc brake according to the first embodiment of the present invention, taken along the line C1—C1 in FIG. 3.

In this embodiment, as shown in FIG. 2, the push rod 44 is divided into two separate bodies, namely, a front body portion 45 located on a front side as viewed in a direction of travel of the push rod 44, (i.e., on a side of the piston 26), and a rear body portion 46 located on a rear side as viewed in the direction of travel of the push rod 44 (i.e., on a side of the bottom portion 33).

Figure 3:
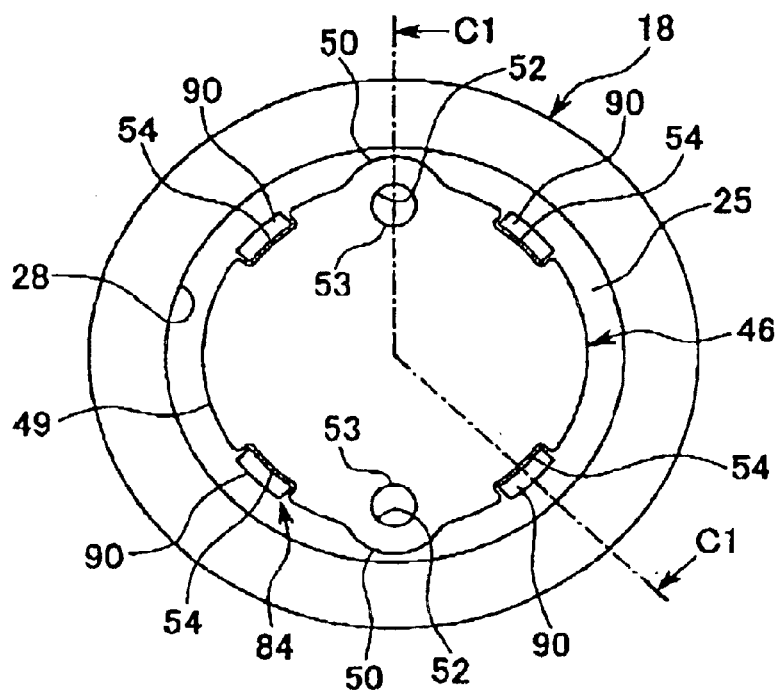
FIG. 3 is a cross-sectional view of the disc brake according to the first embodiment of the present invention, taken along the line A1—A1 in FIG. 2.

The rear body portion 46 of the push rod 44 comprises a shaft portion 48 and flange portion 49 radially outwardly expanding from an end portion of the shaft portion 48. As shown in FIG. 3, the flange portion 49 partially projects in a radially outward direction thereof. Specifically, the flange portion 49 includes a plurality (two in this embodiment) of projections 50 formed therein. The projections 50 are angularly displaced from each other at 180°. Further, as shown in FIG. 2, an axial end portion of the shaft portion 48 on a side opposite the flange portion 49 is axially recessed, to thereby form an abutment recess 51.

In the flange portion 49, a fitting bore 52 is formed at a position inward of each projection 50. The fitting bores 52 axially extend through the flange portion 49. A guide pin 53 is press-fitted into each fitting bore 52, such that the guide pin 53 projects from the flange portion 49 on axially opposite sides thereof by respective predetermined lengths. Further, an outer circumferential surface of the flange portion 49 is recessed, to thereby form a plurality (four in this embodiment) of rotation-preventing recesses 54. The rotation-preventing recesses 54 are formed at positions different from the positions of the projections 50.

The rear body portion 46 thus arranged is provided In the cylinder 18 as shown in FIG. 1, by slidably fitting the shaft portion 48 into the bottom opening 36 of the cylinder 18. The bottom portion 33 of the cylinder 18 includes a plurality (two in this embodiment) of rotation-preventing bores 56 formed therein. The rotation-preventing bore 56 axially extends from the bottom surface 34 at a position displaced from the center axis of the cylinder 18. When the shaft portion 48 is fitted into the bottom opening 36, the guide pins 53 projecting on a side of the shaft portion 48 are slidably fitted into the rotation-preventing bores 56.

It should be noted that by fitting the guide pins 53 into the rotation-preventing bores 56, the rear body portion 46 is enabled to move along the axis of the cylinder 18 and is prevented from rotating on the same axis relative to the cylinder 18.

Thus, the shaft portion 48 of the rear body portion 46 is fitted into the bottom opening 36 while the guide pins 53 are fitted into the rotation-preventing bores 56. In this state, a distal end portion of the cam rod 42 of the cam mechanism 32 is received in the abutment recess 51. It should be noted that a ring-shaped push rod seal 57 is provided for sealing a space between the shaft portion 48 and the bottom opening 36 of the cylinder 18. The push rod seal 57 is held in the shaft portion 48 of the rear body portion 46.

Figure 4:
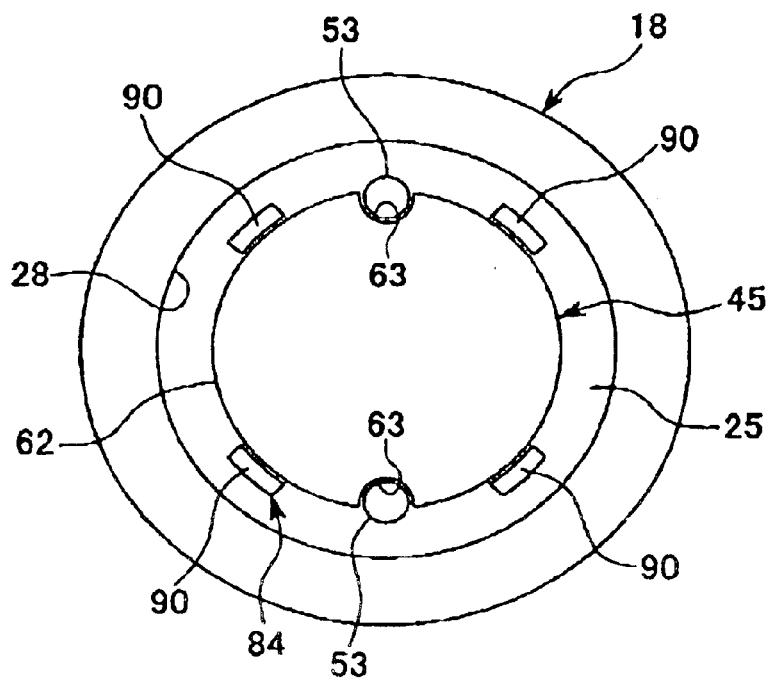
FIG. 4 is a cross-sectional view of the disc brake according to the first embodiment of the present invention, taken along the line B1—B1 in FIG. 2.

The front body portion 45 of the push rod 44 comprises a shaft portion 61 and a flange portion 62 expanding radially outward from an end portion of the shaft portion 61. The shaft portion 61 includes external threads 60 formed in an outer circumferential surface thereof. As shown in FIG. 4, an outer circumferential surface of the flange portion 62 is radially inwardly recessed in an arcuate form, to thereby form a plurality (two in this embodiment) of rotation-preventing recesses (rotation-preventing portions) 63.

As shown in FIG. 2, the flange portion 62 of the front body portion 45 is abutted against the flange portion 49 of the rear body portion 46. In this instance, the rotation-preventing recesses 63 are fitted over the guide pins 53 on a side opposite the shaft portion 48. By fitting the guide pins 53 into the rotation-preventing recesses 63, the front body portion 45 is enabled to move along the axis of the cylinder 18 (the front body portion 45 is capable of being moved away and towards the rear body portion 46) and is prevented from rotating on the same axis relative to the rear body portion 46.

The parking brake mechanism 30 further comprises a substantially cylindrical clutch member 66. The clutch member 66 includes internal threads 65 formed in an inner circumferential surface thereof. In the cylinder 18, the internal threads 65 are engaged with the external threads 60 of the shaft portion 61 of the front body portion 45 of the push rod 44.

The piston 26 comprises a small-inner-diameter portion 68 and a large-inner-diameter portion 69 having a larger inner diameter than the small-inner-diameter portion 68. The small-inner-diameter portion 68 is located on a side of the bottom portion 24, and the large-inner-diameter portion 69 is located on a side of an open end of the piston 26. A taper surface portion 70 is formed between the small-inner-diameter portion 68 and the large-inner-diameter portion 69, which is inclined so as to impart the large-inner-diameter portion 69 with an inner diameter larger than that of the small-inner-diameter portion 68.

The clutch member 66 comprises a fitting portion 72 having a distal end portion fitted into the small-inner-diameter portion 68 of the piston 26, and a taper portion 73 formed adjacent to the fitting portion 72. The taper portion 73 abuts against the taper surface portion 70 of the piston 26.

When the amount of projection of the cam rod 42 is increased by rotating the cam body 39 of the cam mechanism 32, the rear body portion 46 and the front body portion 45 of the push rod 44 and the clutch member 66 linearly move in the axial direction of the cylinder 18. With the taper portion 73 abutting against the taper surface portion 70 of the piston 26, the clutch member 66 causes the piston 26 to slidably move towards the pad 13 relative to the cylinder 18.

The external threads 60 of the front body portion 45 of the push rod 44 and the internal threads 65 of the clutch member 66 provide a threadably engaged portion 74. In the threadably engaged portion 74, a clearance is provided between the front body portion 45 and the clutch member 66 so that the front body portion 45 and the clutch member 66 are capable of axially moving, without rotating, relative to each other by a predetermined amount.

Further, an atmosphere-communicated opening 76 is formed at the bottom portion 24 of the piston 26 so as to allow a space between the bottom portion 24 and the clutch member 66 to communicate with the atmosphere.

In addition, a ring-shaped clutch member seal 77 is provided so as to seal a space between the fitting portion 72 of the clutch member 66 and the small-inner-diameter portion 68 of the piston 26. The clutch member seal 77 is held in the fitting portion 72 of the clutch member 66.

The parking brake mechanism 30 includes an adjustment portion 80 for conducting adjustment of a positional relationship between the clutch member 66 and the front body portion 45 of the push rod 44 in the cylinder 18.

The adjustment portion 80 is supported between the piston 26 and the clutch member 66 by means of a stop ring 82 engaged with an engaging groove 81 formed in the large-inner-diameter portion 69 of the piston 26. When the piston 26 axially moves under a brake fluid pressure introduced into the cylinder 18, the adjustment portion 80 allows the clutch member 66 to rotate, to thereby effect an axial movement of the clutch member 66 following the piston 26, relative to the push rod 44 which is substantially stationary. When the front body portion 45 of the push rod 44 performs a linear movement in the axial direction of the cylinder 18, the adjustment portion 80 does not allow rotation of the clutch member 66 relative to the front body portion 45. Consequently, the clutch member 66 and the push rod 44 are linearly moved as a unit, by means of the threadably engaged portion 74 formed by the external threads 60 and the internal threads 65.

The parking brake mechanism 30 further includes a spring cover 84 and a push rod bias spring (a push rod biasing member) 85. The spring cover 84 is provided within the cylinder 18 so as to cover a part of the clutch member 66 and part of the front body portion 45 and the rear body portion 46. The push rod bias spring 85 is provided between the flange portion 62 of the front body portion 45 of the push rod 44 and a surface of the spring cover 84 on a side of the piston 26.

The spring cover 84 comprises a ring-shaped portion 87 through which the clutch member 66 is inserted, a cylindrical portion 88 axially extending in one direction from a radially outer end portion of the ring-shaped portion 87, a plurality (four in this embodiment) of extended portions 90 further extending in the same direction from the cylindrical portion 88 on a side opposite the ring-shaped portion 87 and a plurality of locking tab portions 89 raised radially outwardly from the cylindrical portion 88 on a side opposite the ring-shaped portion 87.

As shown in FIG. 4, in the spring cover 84, the extended portions 90 extend over the outer circumferential surface of the flange portion 62 of the front body portion 45 of the push rod 44, and, as shown in FIG. 3, engage the rotation-preventing recesses 54 of the flange portion 49 of the rear body portion 46. Further, in the extended portions 90, as shown in FIG. 2, the portions extending beyond the flange portion 49 are bent radially inward, to thereby form bent portions 91. The bent portions 91 are engaged with the flange portion 49 of the rear body portion 46 on a side of the shaft portion 48.

In this state, the push rod bias spring 85 is provided between the ring-shaped portion 87 of the spring cover 84 and the flange portion 62 of the front body portion 45 of the push rod 44. In other words, the spring cover 84, together with the front body portion 45 of the push rod 44, holds the push rod bias spring 85.

By engaging the extended portions 90 of the spring cover 84 with the rotation-preventing recesses 54 of the flange portion 49 of the rear body portion 46, axial rotation of the spring cover 84 relative to the rear body portion 46 can be restricted. That is, since the front body portion 45, the rear body portion 46 and the cylinder 18 are prevented from rotating relative to each other by means of the guide pins 53, the spring cover 84 is prevented from rotating relative to the front body portion 45, the rear body portion 46 and the cylinder 18.

Figure 5:
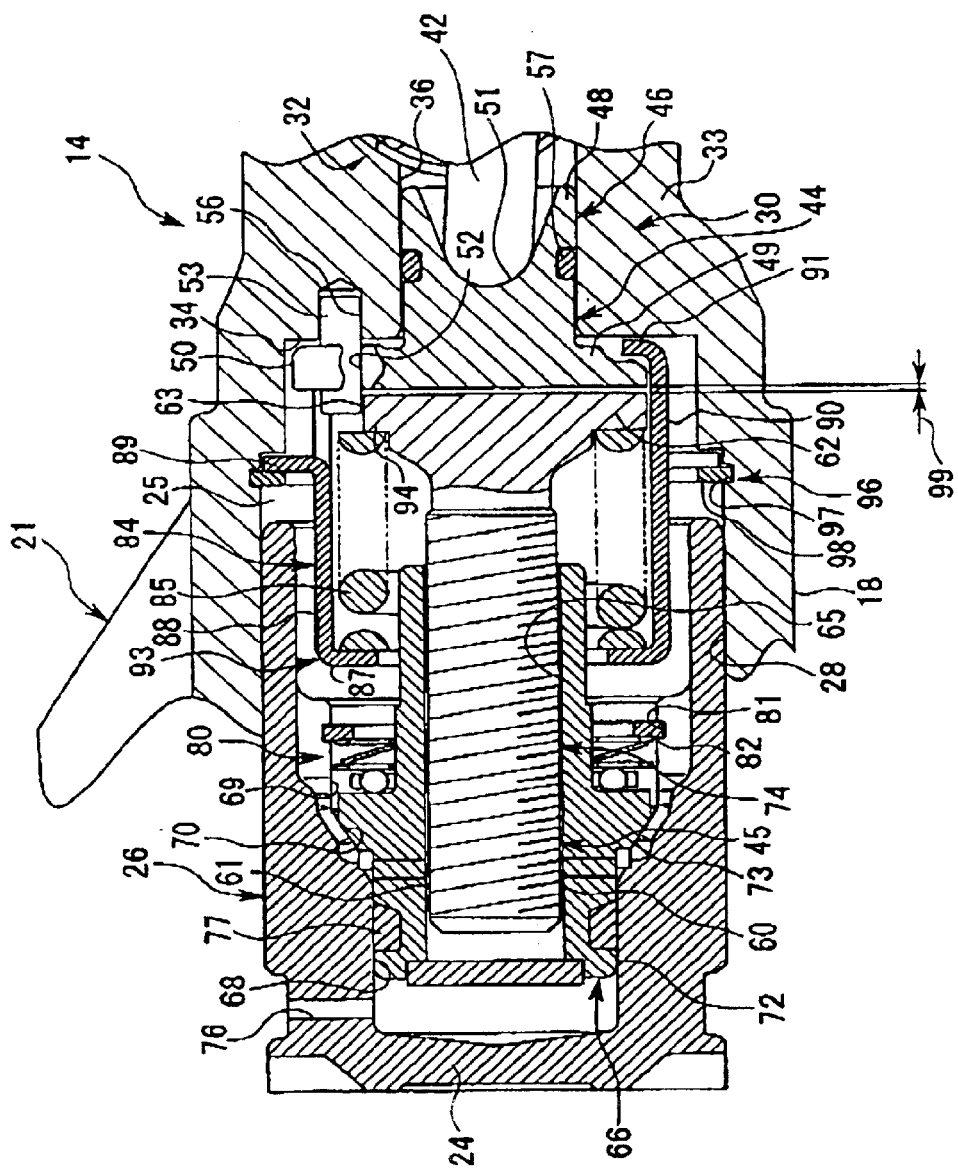
FIG. 5 is a cross-sectional view of the essential part of the disc brake according to the first embodiment of the present invention, taken along the line C1—C1 in FIG. 3, in which a clearance is formed between a front body portion and a rear body portion of a push rod.

The bent portion 91 is bent at a position such that a preset length of the push rod bias spring 85 when it is assembled into a cartridge 93 (described later) becomes a length X1, which is shorter than a free length X0 (X1 is a sum of X2 and X3 indicated in FIG. 2). When the cartridge 93 is inserted into the cylinder 18 across the engaging groove 97, and locked by a C-shaped stop ring 98 with the cam rod 42 pressing against the abutment recess 51 of the rear body portion 46, the bent portion 91 is separated from the bottom surface 34 of the cylinder 18. In this state, due to the cam rod 42 pressing against the abutment recess 51, the push rod bias spring 85 further contracts, so that the length of the push rod bias spring 85 becomes a preset length X2 indicated in FIG. 2 while forming a clearance X3 between the flange portion 49 and the bent portion 91. By this arrangement, the push rod 44 is positioned, and, as shown in FIG. 5, the push rod bias spring 85 is enabled to allow separation between the front body portion 45 and the rear body portion 46 with a predetermined clearance 99.

In the parking brake mechanism 30 before it is assembled to the cylinder 18, the front body portion 45, the rear body portion 46 with the guide pins 53 being attached thereto, the push rod bias spring 85 and the spring cover 84 are formed into an assembly as a single cartridge 93.

That is, for example, before forming the bent portions 91 of the spring cover 84, the push rod bias spring 85 is inserted into the spring cover 84 and abutted against the ring-shaped portion 87. Then, the shaft portion 61 of the front body portion 45 of the push rod 44 is inserted into the push rod bias spring 85 until the flange portion 62 located inwardly of the extended portions 90 of the spring cover 84 abuts against the push rod bias spring 85.

Further, the rear body portion 46 of the push rod 44 is abutted against the front body portion 45 so that the extended portions 90 of the spring cover 84 are fitted into the rotation-preventing recesses 54 of the flange portion 49 while the guide pins 53 are fitted into the rotation-preventing recesses 63 of the front body portion 45.

Next, while forming a clearance so that the front body portion 45 and the rear body portion 46 are capable of being separated from each other by a predetermined distance, distal end portions of all the extended portions 90 of the spring cover 84 are bent radially inward at the flange portion 49 on a side opposite the front body portion 45, to thereby form the bent portions 91. Thus, separation of the rear body portion 46 from the spring cover 84 can be prevented.

As has been described above, the front body portion 45 and the rear body portion 46 (including the guide pins 53) of the push rod 44, the push rod bias spring 85 and the spring cover 84 are formed into the cartridge 93. Parting surfaces of the front body portion 45 and the rear body portion 46 exist in the interior of the cartridge 93. The push rod seal 57 may be connected either before or after forming the cartridge 93.

The cylinder 18 includes a locking stepped portion 96. The locking stepped portion 96 is formed at a position located on a side of the open portion 17 of the cylinder 18 relative to an abutment surface 94 of the push rod 44 for abutment against the push rod bias spring 85. The locking stepped portion 96 comprises the engaging groove 97 in an annular form formed in the inner circumferential surface 28 of the cylinder 18 and the C-shaped stop ring 98 engaged with the engaging groove 97.

The disc brake arranged as mentioned above is assembled in a manner described below. First, the bearings 38 and the cam body 39 are inserted into the cam opening 35 of the caliper body 21, and the cam recess 40 is directed towards the bottom opening 36. In this state, the cam rod 42 is inserted into the cylinder 18 of the caliper body 21 through the open portion 17, and further inserted into the cam recess 40 through the bottom opening 36.

Next, the cartridge 93, which has been formed in the above-mentioned manner and connected to the push rod seal 57, is inserted into the cylinder 18 through the open portion 17. The shaft portion 48 of the rear body portion 46 of the push rod 44 is fitted into the bottom opening 36 of the bottom portion 33 so that the cam rod 42 is inserted into the abutment recess 51 of the shaft portion 48. The guide pins 53 are fitted into the rotation-preventing bores 56. Finally, the bent portions 91 are abutted against the bottom surface 34. When the bent portions 91 abut against the bottom surface 34, a gap is created between the flange portion 49 of the rear body portion 46 and the bottom surface 34.

Then, the stop ring 98 is inserted into the cylinder 18, and engaged with the engaging groove 97. The stop ring 98 locks the locking tab portions 89 of the spring cover 84 of the cartridge 93, to thereby prevent separation of the cartridge 93.

On the other hand, the clutch member 66 with the clutch member seal 77 being attached thereto is fitted into the piston 26, and the adjustment portion 80 is locked in the piston 26 by the stop ring 82. Thus, the piston 26, the clutch member 66 and the adjustment portion 80 are formed into a separate assembly, which is then fitted into the cylinder 18. In the cylinder 18, the clutch member 66 is threadably engaged with the push rod 44. Thus, the caliper 14 is obtained.

In this disc brake, when the cam body 39 of the cam mechanism 32 is rotated by operating a parking brake lever (not shown), the amount of projection of the cam rod 42 of the cam mechanism 32 increases, thus moving the rear body portion 46 of the push rod 44 in the direction of the disc 12. Consequently, the front body portion 45 which abuts against the rear body portion 46 also moves in the direction of the disc 12. The clutch member 66 moves, together with the front body portion 45, to thereby move the piston 26 in the direction of the disc 12. Thus, the pads 13 are mechanically pressed against the disc 12.

During normal braking effected by operating a brake pedal, a brake fluid pressure is introduced into an area between the cylinder 18 and the piston 26. A thrust force acting in the direction of the disc 12 is generated in the piston 26, due to the action of the fluid pressure applied to a pressure-receiving surface of the piston seal 27. The fluid pressure also acts on a pressure-receiving area of the clutch member seal 77, so that a thrust force acting in the direction of the disc 12 is also generated in the clutch member 66. In an initial period of a braking operation, the clutch member 66 axially moves, without rotating, by an amount corresponding to the clearance provided between the clutch member 66 and the front body portion 45 at the threadably engaged portion 74, thus pressing the piston 26.

When the brake fluid pressure in the cylinder 18 further increases and reaches a predetermined level, the clutch member 66 is forced against the piston 26 due to the fluid pressure acting on the clutch member 66. Thus, a fluid pressure acts on the piston 26 and the clutch member 66, so that a thrust force acting in the direction of the disc 12 is generated in the piston 26 and the clutch member 66.

On the other hand, the fluid pressure also acts on a pressure-receiving area of the push rod seal 57. Therefore, a thrust force acting in a direction opposite to the location of the disc 12 is generated in the rear body portion 46 of the push rod 44. In the present invention, the push rod 44 is divided into the front body portion 45 and the rear body portion 46 which are separable from each other. Therefore, the thrust force of the rear body portion 46 acting in the direction opposite to the location of the disc 12 can be separated from the thrust force of the front body portion 45 acting in the direction of the disc 12.

With this arrangement in the first embodiment, a loss of an output force of a piston under a high fluid pressure can be prevented. Therefore, there is no need to increase a piston diameter to compensate for a loss of an output force of a piston. Therefore, a reduction in size of a disc brake can be achieved.

In the present invention, the guide pins 53 and the spring cover 84 are used, so as to ensure that the front body portion 45 and the rear body portion 46 of the push rod 44 are capable of only an axial movement towards and away from each other, while their rotation relative to the cylinder 18 is restricted. This is advantageous as compared to spline engagement, which is conventionally employed for permitting a linear movement of an element while preventing rotation thereof. In spline engagement, keys become thin due to Fretting Wear, leading to the problem of generation of pronounced noise during a braking operation.

When the push rod 44 is divided into the front body portion 45 and the rear body portion 46, there is a possibility that after insertion of the rear body portion 46 into the caliper body 21, a cumbersome operation will be necessary to insert the front body portion 45 into the caliper body 21 while making an adjustment such that the front body portion 45 abuts against the rear body portion 46 in a predetermined angular positional relationship. In the present invention, such an operation is unnecessary. Outside the caliper body 21, the front body portion 45 and the rear body portion 46 are abutted against each other in a desired angular positional relationship and connected to the spring cover 84 and the push rod bias spring 85, to thereby obtain the cartridge 93. Therefore, an increase in the number of operations required for assembling the disc brake can be suppressed.

Figure 6:
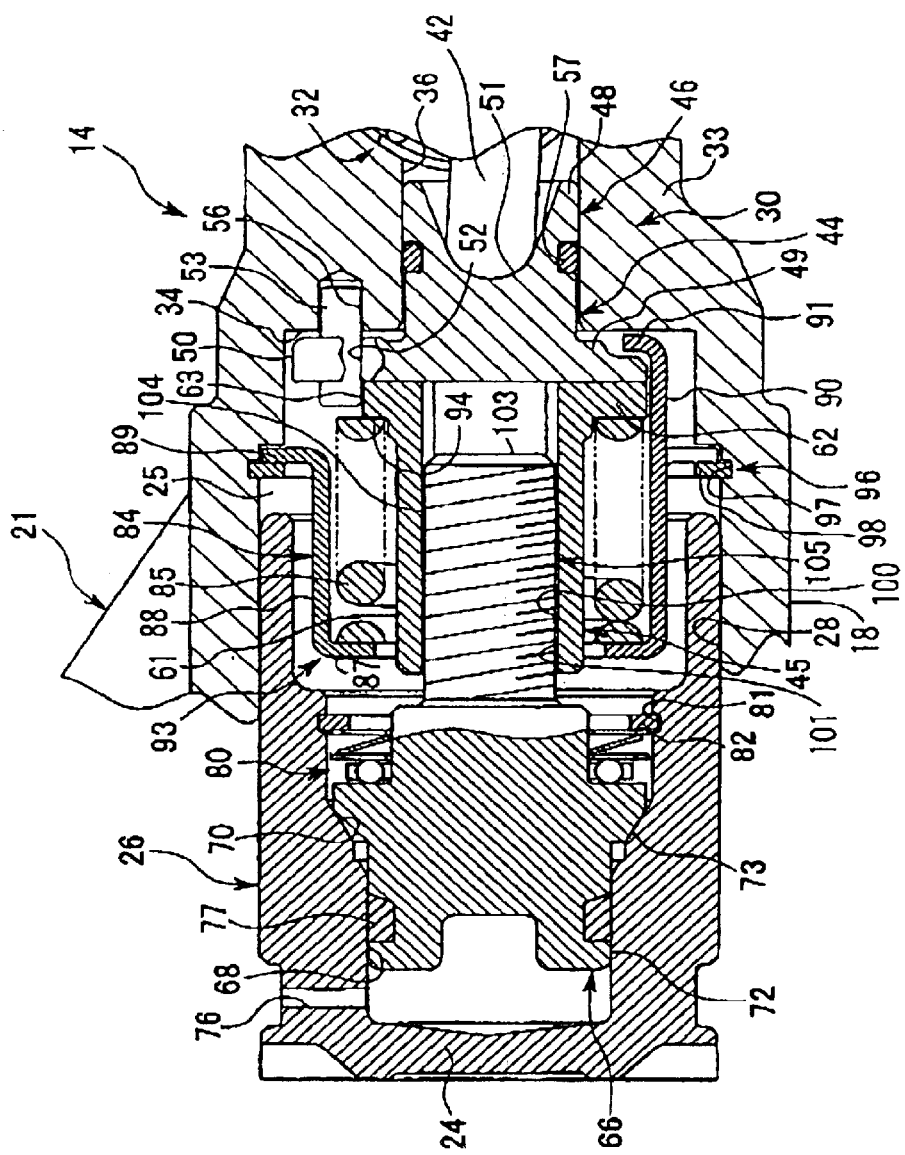
FIG. 6 is a cross-sectional view of an essential part of a disc brake according to a second embodiment of the present invention, taken along a line corresponding to the line C1—C1 in FIG. 3.

Next, referring to FIG. 6, explanation is made with regard to a second embodiment of the present invention. The following explanation mainly describes the portions which are different from those in the first embodiment. The same portions as used in the first embodiment are designated by the same reference numerals as used in FIGS. 1 to 5, and explanation thereof is omitted.

In the second embodiment, the relationship between the front body portion 45 of the push rod 44 and the clutch member 66 in threadable engagement is in reverse to that in the first embodiment. That is, in the front body portion 45 in the second embodiment, a through-hole 100 is formed in the shaft portion 61, and internal threads 101 are formed in an inner circumferential surface of the shaft portion 61 in the through-hole 100. In the clutch member 66 in the second embodiment, a shaft portion 103 is formed on a side opposite to the fitting portion 72, and external threads 104 are formed in an outer circumferential surface of the shaft portion 103. The internal threads 101 and the external threads 104 are threadably engaged, to thereby form a threadably engaged portion 105. In the threadably engaged portion 105 also, a predetermined clearance is provided in the axial direction of the cylinder 18.

In the second embodiment, the same effect as exerted by the first embodiment can be obtained.

Figure 7:
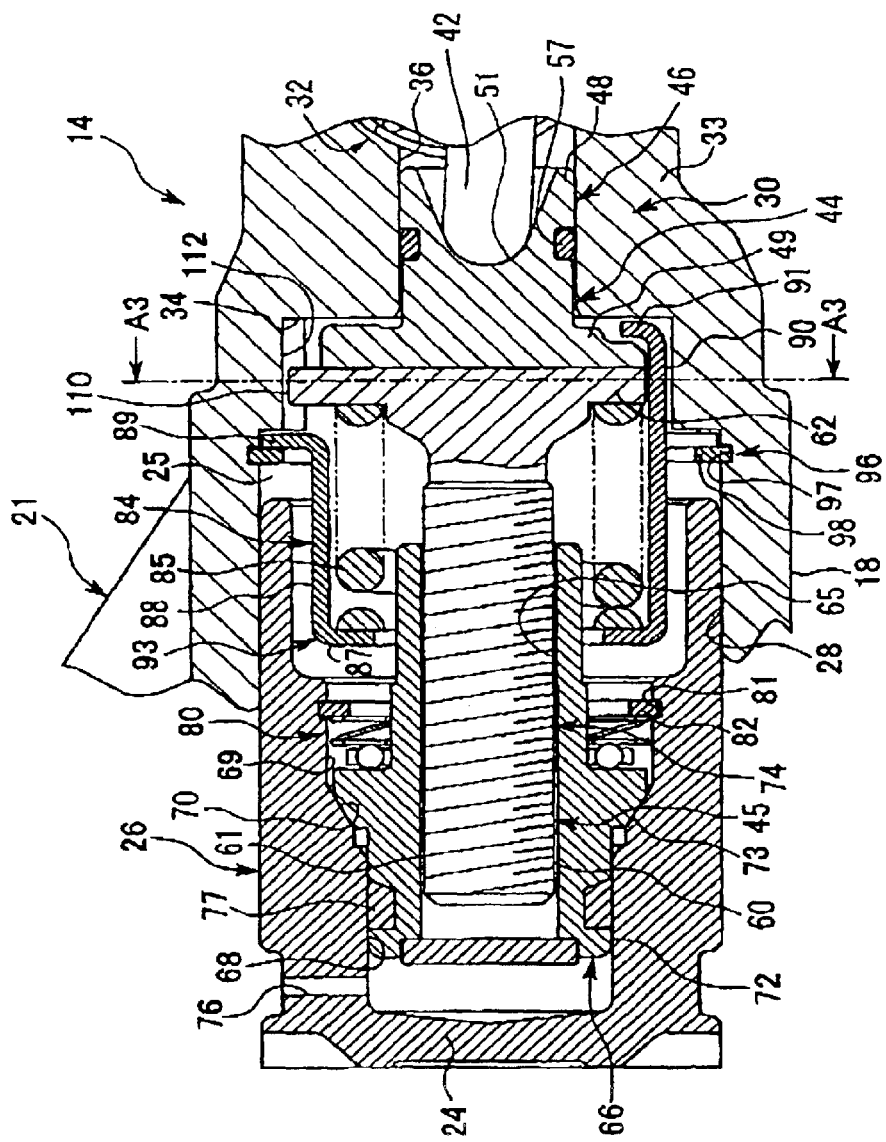
FIG. 7 is a cross-sectional view of an essential part of a disc brake according to a third embodiment of the present invention, taken along the line C3—C3 in FIG. 8.
Figure 8:
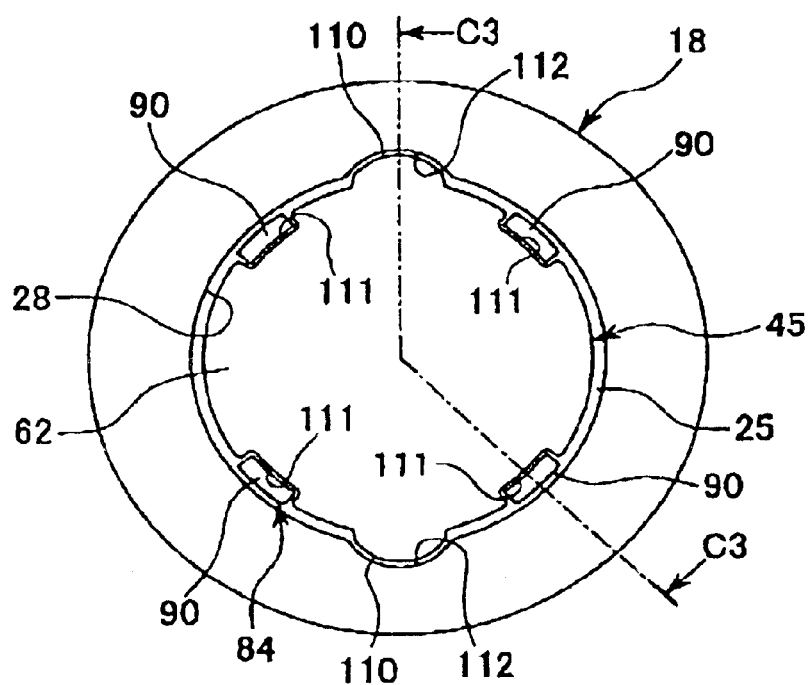
FIG. 8 is a cross-sectional view of the disc brake according to the third embodiment of the present invention, taken along the line A3—A3 in FIG. 7.

Next, referring to FIGS. 7 and 8, explanation is made with regard to a third embodiment of the present invention. The following explanation mainly describes the portions which are different from those in the first embodiment. The same portions as used in the first embodiment are designated by the same reference numerals as used in FIGS. 1 to 5, and explanation thereof is omitted.

In the third embodiment, the fitting bores 52 are not formed in the flange portion 49 of the rear body portion 46 and hence, the guide pins 53 are not provided in the flange portion 49 of the rear body portion 46. Further, as shown in FIG. 8, a plurality (two in this embodiment) of rotation-preventing projections 110 is formed on the outer circumferential surface of the flange portion 62 of the front body portion 45. The rotation-preventing projection 110 projects radially outward, and has a semicircular cross-section taken perpendicularly to the axis of the front body portion 45. Further, rotation-preventing recesses 111 are formed in the outer circumferential surface of the flange portion 62 of the front body portion 45. The rotation-preventing recesses 111 are located at positions different from those of the rotation-preventing projections 110 and fittingly receive the extended portions 90 of the spring cover 84.

Further, the inner circumferential surface 28 of the cylinder 18 includes rotation-preventing recesses 112. Each rotation-preventing recess 112 has a semicircular cross-section taken perpendicularly to the axis of the cylinder 18, and fittingly receives the rotation-preventing projection 110. When the flange portion 62 of the front body portion 45 rotates, curved surfaces of the rotation-preventing projection 110 and the rotation-preventing recess 112 abut against each other. If the rotation-preventing projection 110 abuts against an angular end portion of the rotation-preventing recess 112, the rotation-preventing projection 110 becomes worn. Therefore, it becomes difficult, over time, to continue to obtain an effect of preventing rotation of the front body portion 45. In the present invention, the rotation-preventing projection 110 and the rotation-preventing recess 112 abut against each other at their curved surfaces. Therefore, if either the rotation-preventing projection 110 or the rotation-preventing recess 112 becomes worn, the area of a surface of abutment becomes large. Therefore, over time, rotation of the front body portion 45 can be more reliably prevented.

In this embodiment, by fitting the rotation-preventing projections 110 of the front body portion 45 into the rotation-preventing recesses 112 of the cylinder 18, relative rotation between the cylinder 18 and the front body portion 45 can be restricted. By fitting the extended portions 90 of the spring cover 84 into the rotation-preventing recesses 111, rotation of the spring cover 84 relative to the front body portion 45 can be restricted. Further, by fitting the rotation-preventing recesses 54 over the extended portions 90 of the spring cover 84, rotation of the rear body portion 46 relative to the spring cover 84 can be restricted. The rotation-preventing projections 110 move along the rotation-preventing recesses 112 and the rotation-preventing recesses 111 move along the extended portions 90, so that the front body portion 45 and the rear body portion 46 are capable of moving towards and away from each other while their rotation relative to each other is restricted.

In the third embodiment, as in the first embodiment, the front body portion 45 and the rear body portion 46 of the push rod 44, the push rod bias spring 85 and the spring cover 84 are formed into an assembly as the single cartridge 93. During assembly, for inserting the front body portion 45 of the push rod 44 into the spring cover 84, with the push rod bias spring 85 abutting against the spring cover 84, the rotation-preventing recesses 111 of the flange portion 62 are fitted over the extended portions 90. Then, the rear body portion 46 of the push rod 44 is abutted against the front body portion 45 by fitting the rotation-preventing recesses 54 of the flange portion 49 over the extended portions 90 of the spring cover 84. The cartridge 93 is formed in substantially the same manner as in the first embodiment, except for the above-mentioned operations. The thus obtained cartridge 93 is inserted into the cylinder 18 by fitting the rotation-preventing projections 110 into the rotation-preventing recesses 112.

In the third embodiment, the same effect as exerted by the first embodiment can be obtained. Since the rotation-preventing projection 110 and the rotation-preventing recess 112 abut against each other at their curved surfaces, if either the rotation-preventing projection 110 or the rotation-preventing recess 112 becomes worn, rotation of the front body portion 45 can be reliably prevented.

Figure 9:
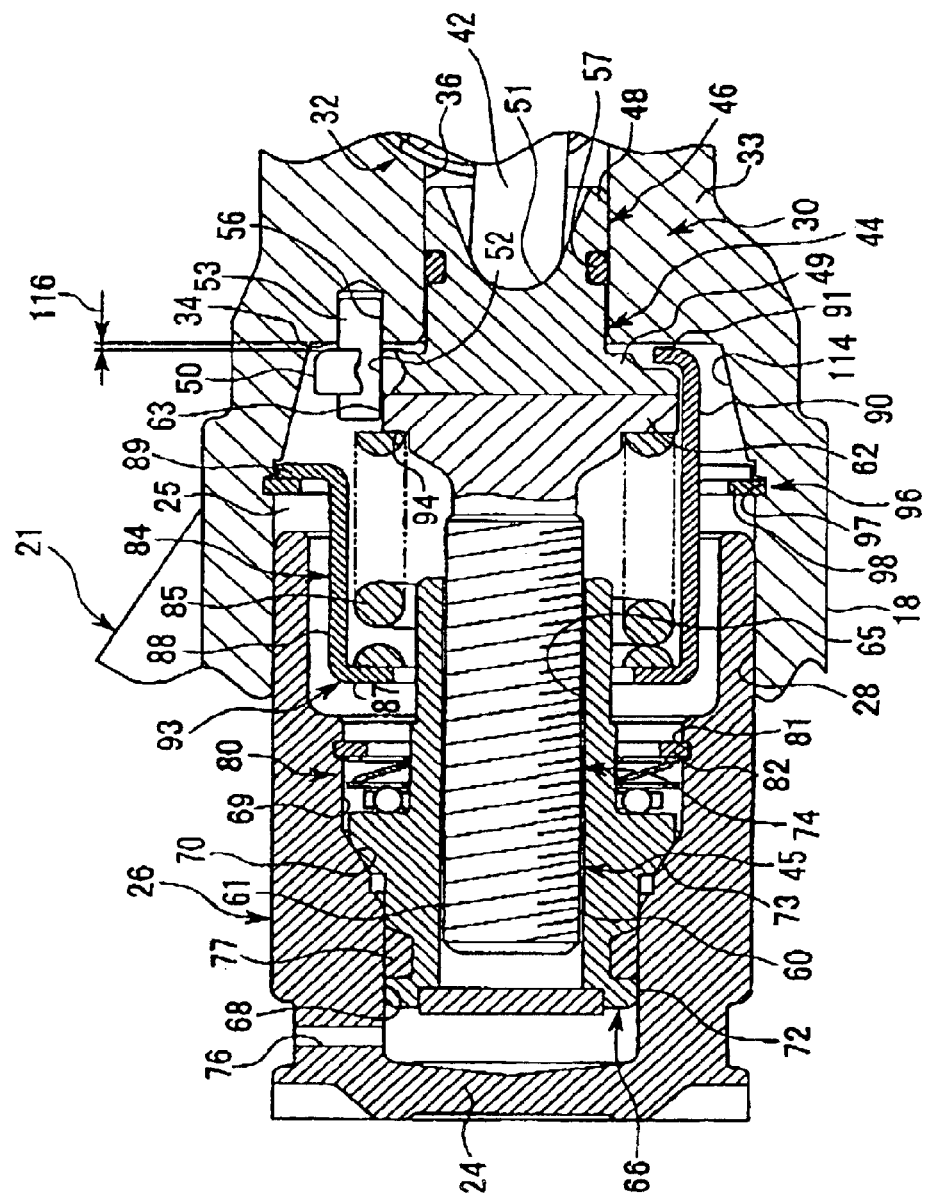
FIG. 9 is a cross-sectional view of an essential part of a disc brake according to a fourth embodiment of the present invention, taken along a line corresponding to the line C1—C1 in FIG. 3.

Next, referring to FIG. 9, a disc brake according to a fourth embodiment of the present invention is explained. The following explanation mainly describes the portions different from those in the first embodiment. The same portions as used in the first embodiment are designated by the same reference numerals as used in FIGS. 1 to 5, and explanation thereof is omitted.

In the fourth embodiment, the inner circumferential surface 28 of the cylinder 18 includes a taper surface 114 on a side of the bottom surface 34 of the cylinder 18. The taper surface 114 is formed such that its diameter increases in a direction away from the bottom surface 34. An end of the taper surface 114 on a side of the bottom surface 34 is located on a side of the bottom surface 34 relative to the axial center of the flange portion 49 of the rear body portion 46. A clearance 116 is always provided between the flange portion 49 of the rear body portion 46 and the bottom surface 34.

In the fourth embodiment, the same effect as exerted by the first embodiment can be obtained. In addition, by forming the taper surface 114, a gap is created between the cylinder 18 and a radially outer side of the flange portion 49 of the rear body portion 46. Therefore, air accumulated at the bottom surface 34 of the cylinder 18 when a brake fluid is introduced into an area between the cylinder 18 and the piston 26 can be satisfactorily released through the gap between the cylinder 18 and the flange portion 49 formed by the taper surface 114.

Figure 10:
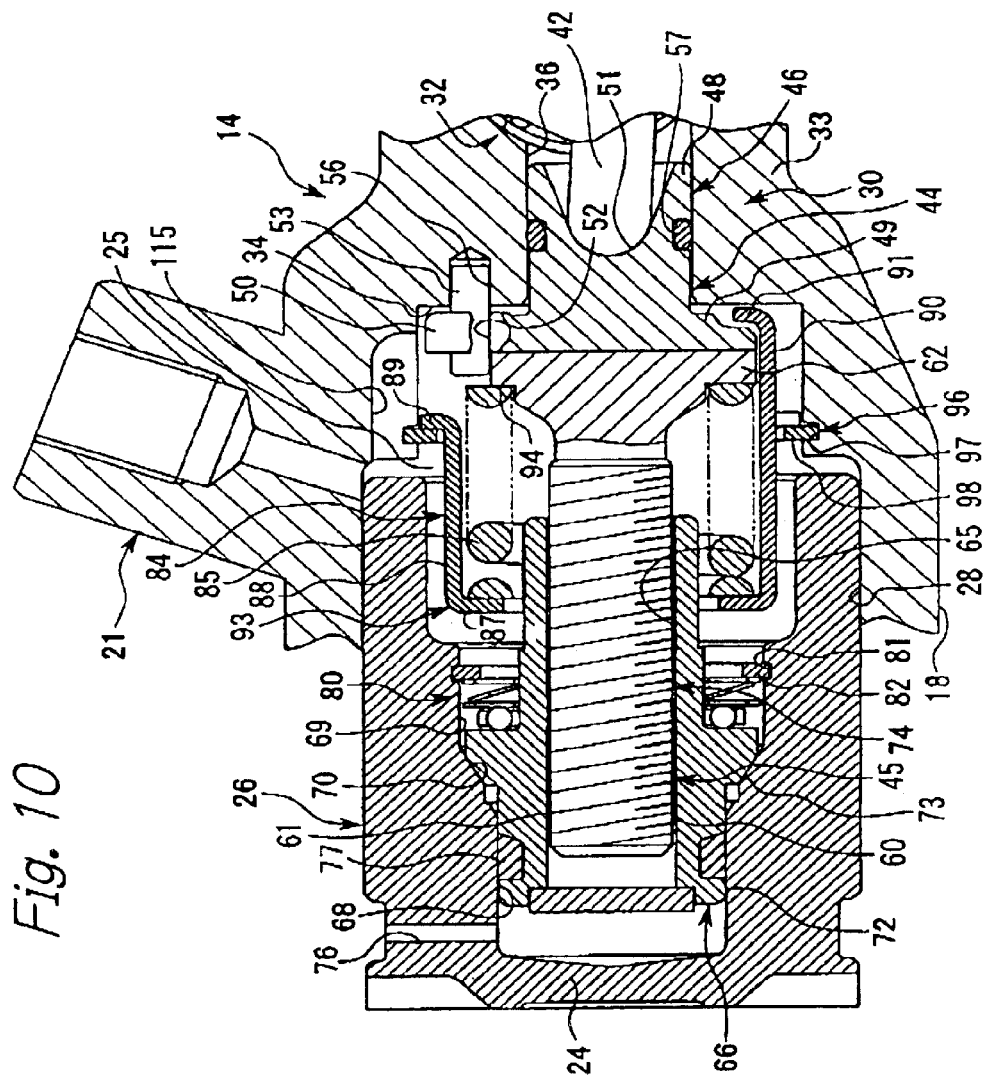
FIG. 10 is a cross-sectional view of an essential part of a disc brake according to a fifth embodiment of the present invention, taken along a line corresponding to the line C1—C1 in FIG. 3.

Next, referring to FIG. 10, a disc brake according to a fifth embodiment of the present invention is explained. The following explanation mainly describes the portions different from those in the first embodiment. The same portions as used in the first embodiment are designated by the same reference numerals as used in FIGS. 1 to 5, and explanation thereof is omitted.

In the fifth embodiment, an upper portion of the inner circumferential surface 28 of the cylinder 18 on a side of the bottom surface 34 is recessed, to thereby form an air release groove 115. An end of the air release groove 115 on a side of the bottom surface 34 is located on a side of the bottom surface 34 relative to the axial center of the flange portion 49 of the rear body portion 46. Further, a clearance is always provided between the flange portion 49 of the rear body portion 46 and the bottom surface 34. It should be noted that the air release groove 115 is formed during casting of the caliper body 21. Therefore, the air release groove 115 has a casting surface.

In the fifth embodiment, the same effect as exerted by the first embodiment can be obtained. In addition, by forming the air release groove 115, a gap is created between the cylinder 18 and the radially outer side of the flange portion 49 of the rear body portion 46. Therefore, air accumulated at the bottom surface 34 of the cylinder 18 when a brake fluid is introduced into an area between the cylinder 18 and the piston 26 can be satisfactorily released through the gap between the cylinder 18 and the flange portion 49 formed by the air release groove 115.

Next, referring to FIGS. 11 to 15, a disc brake according to a sixth embodiment of the present invention is explained. The following explanation mainly describes the portions different from those in the first embodiment. The same portions as used in the first embodiment are designated by the same reference numerals as used in FIGS. 1 to 5, and explanation thereof is omitted.

Figure 11:
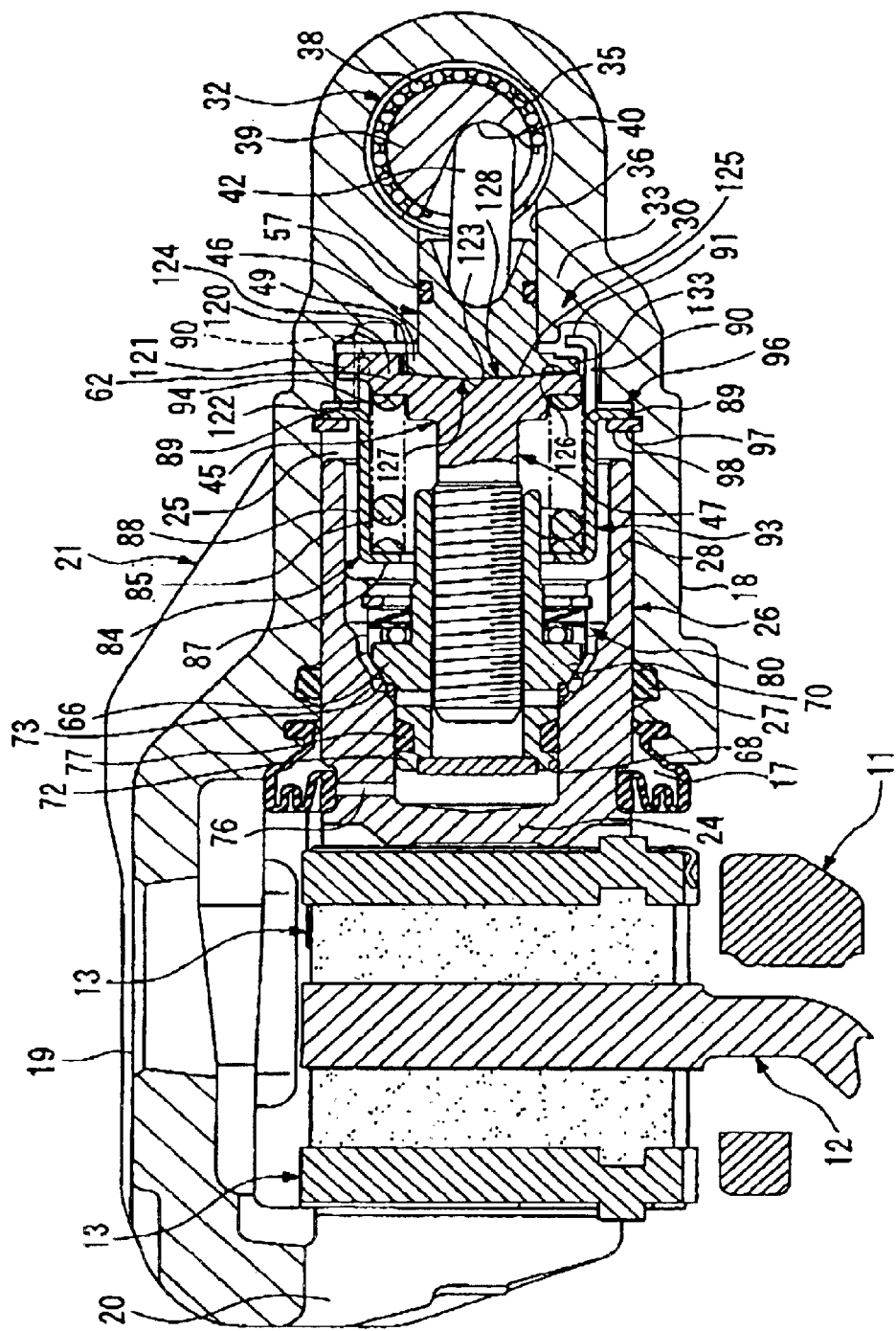
FIG. 11 is a cross-sectional view of a disc brake according to a sixth embodiment of the present invention.

In the sixth embodiment, as shown in FIG. 11, the fitting bores 52 are not formed in the flange portion 49 of the rear body portion 46 and hence, the guide pins 53 are not provided in the flange portion 49 of the rear body portion 46. Further, a plurality (two in this embodiment) of rotation-preventing projecting portions 120 is formed on the outer circumferential surface of the flange portion 62 of the front body portion 45. The rotation-preventing projecting portion 120 first projects to the side opposite to the shaft portion 61 and then extends radially outward. The rotation-preventing projecting portions 120 are circumferentially arranged, and angularly displaced from each other at 180°. Each rotation-preventing projecting portion 120 includes a rotation-preventing projection 121, which has a semicircular cross-section and radially outwardly projects from the outer circumferential surface of the rotation-preventing projecting portion 120. The rotation-preventing projection 121 is in the form of an arc whose center is located on a line perpendicular to the axis of the front body portion 45.

Further, the inner circumferential surface 28 of the cylinder 18 includes a plurality (two in this embodiment) of rotation-preventing axial grooves 122. Each rotation-preventing axial groove 122 is radially outwardly recessed in an arcuate form and extends in the axial direction of the cylinder 18. The rotation-preventing axial grooves 122 are circumferentially arranged, and angularly displaced from each other at 180°. The rotation-preventing axial groove 122 is in a semicircular form whose center is located on a line perpendicular to the axis of the cylinder 18, and has a larger radius of curvature than the rotation-preventing projection 121.

When the shaft portion 48 of the rear body portion 46 is fitted into the bottom opening 36 of the cylinder 18 and the front body portion 45 is abutted against the rear body portion 46, each rotation-preventing projection 121 of the front body portion 45 is engaged with a corresponding rotation-preventing axial groove 122, thus preventing axial rotation of the front body portion 45 relative to the cylinder 18 while permitting an axial slidable movement of the front body portion 45 relative to the cylinder 18. By this arrangement, as is the case with the first embodiment, the front body portion 45 is capable of moving towards and away from the rear body portion 46 while its axial rotation relative to the cylinder 18 is restricted.

In the sixth embodiment, an end portion of the flange portion 49 on a side opposite to the shaft portion 48 includes a convex spherical surface 123 which curves outward in an axial direction of the rear body portion 46. The convex spherical surface 123 comprises a spherical surface having its center located on the center axis of the rear body portion 46. The flange portion 49 also includes an annular outer end face 124 formed on the radially outer side of the convex spherical surface 123. The outer end face 124 extends in a direction perpendicular to the center axis of the rear body portion 46. The flange portion 62 includes, on a side opposite to the shaft portion 61, a concave spherical surface 125 which curves inward in an axial direction of the front body portion 45 at a position inward of the rotation-preventing projecting portions 120. The concave spherical surface 125 comprises a spherical surface having its center located on the center axis of the front body portion 45. The flange portion 62 also includes an annular outer end face 126 formed on the radially outer side of the concave spherical surface 125. The outer end face 126 extends in a direction perpendicular to the center axis of the front body portion 45. The convex spherical surface 123 and the outer end face 124 form a parting surface 127 of the rear body portion 46, and the concave spherical surface 125 and the outer end face 126 form a parting surface 128 of the front body portion 45. The parting surfaces 127 and 128 face each other. In this embodiment, the radius of curvature of the concave spherical surface 125 is slightly larger than that of the convex spherical surface 123.

Therefore, when the rear body portion 46 is disposed, such that the convex spherical surface 123 abuts against the concave spherical surface 125 of the front body portion 45, the front body portion 45 and the rear body portion 46 are coaxially arranged, and a slight gap is formed between the outer end face 124 outward of the convex spherical surface 123 and the outer end face 126 outward of the concave spherical surface 125. With this arrangement, the front body portion 45 and the rear body portion 46 abut against each other in such a manner as to allow a rocking movement thereof about the center axis of the front body portion 18. Therefore, if the rear body portion 46 tilts relative to the axis of the cylinder 18 by being pressed by the cam rod 42 of the cam mechanism 32 obliquely relative to the axis of the cylinder 18, the front body portion 45 does not tilt relative to the axis of the cylinder 18 and an axial movement of the front body portion 45 is not inhibited. Therefore, satisfactory responsiveness of the brake can be ensured.

Figure 12:
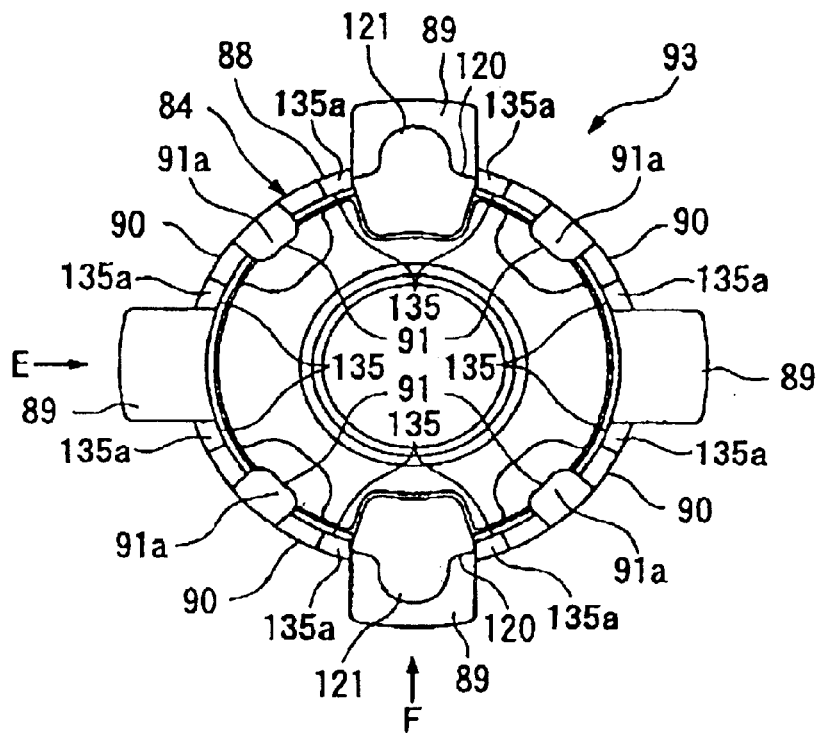
FIG. 12 shows a cartridge in the disc brake in the sixth embodiment of the present invention, as viewed from the rear body portion in an axial direction.
Figure 13:
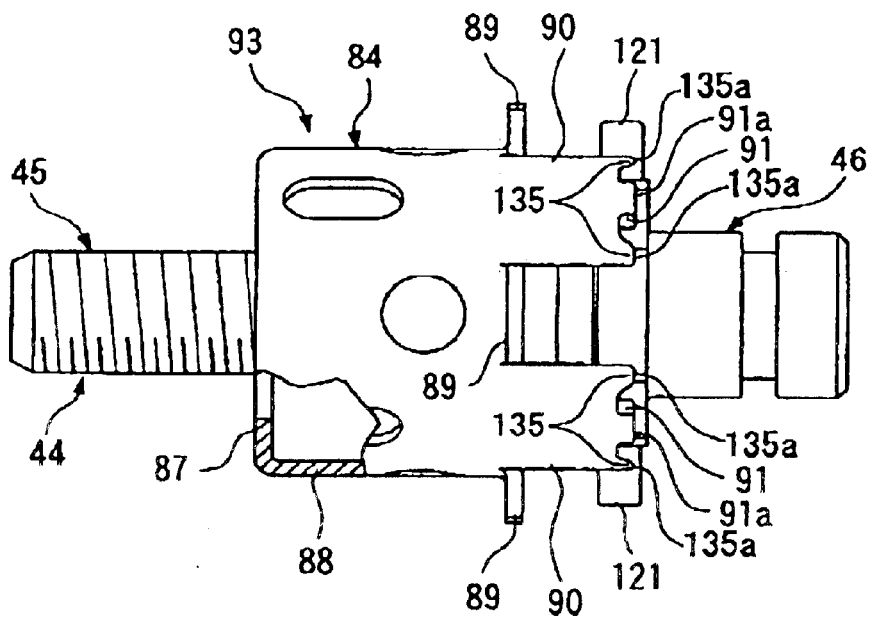
FIG. 13 is a side view of the cartridge in the disc brake in the sixth embodiment of the present invention, as viewed in a direction E indicated in FIG. 12.
Figure 14:
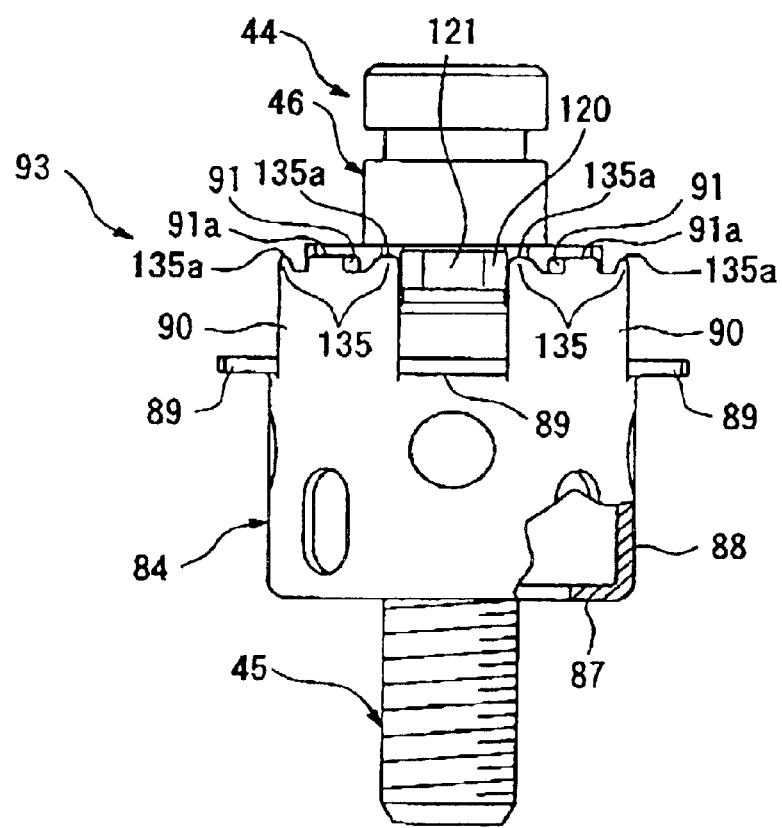
FIG. 14 is a front view of the cartridge in the disc brake in the sixth embodiment of the present invention, as viewed in a direction F indicated in FIG. 12.

FIGS. 12 to 14 show the cartridge 93 in the sixth embodiment. In the cartridge 93 in the sixth embodiment, as shown in FIG. 14, the rotation-preventing projecting portion 120 is fitted into a recess formed between the adjacent extended portions 90 of the spring cover 84. The length of the extended portion 90 is determined so that the rotation-preventing projecting portion 120 constantly fits within the recess by a length equal to or more than ⅓ the thickness of the rotation-preventing projecting portion 120 in an axial direction of the cartridge 93. Consequently, the spring cover 84 is always prevented from rotating relative to the push rod 44.

Further, in the sixth embodiment, as indicated in FIGS. 12 to 14, the bent portion 91 is formed at a central portion in a circumferential direction of a distal end of the extended portion 90. The extended portion 90 also includes reference portions 135, which are formed on circumferentially opposite sides of the bent portion 91. The bent portion 91 has a distal end face 91a facing in the axial direction of the cartridge 93, and the reference portions 135 have distal end faces 135a facing in the axial direction of the cartridge 93. The distal end face 91a coincides with the distal end faces 135a in terms of position in the axial direction of the cartridge 93. In other words, the bent portion 91 is bent, from a position indicated by a two-dot chain line in FIG. 15, based on the positions of the distal end faces 135a of the reference portions 135 so that the distal end face 91a becomes flush with the distal end faces 135a. For example, the bent portion 91 can be accurately formed using a bending tool (not shown) abutted against the distal end-faces 135a of the reference portions 135.

As has been described above, when a high brake fluid pressure is applied to the cylinder, the fluid pressure acts on the piston and the clutch member, so that a thrust force acting in the direction of the disc is generated in the piston and the clutch member. At the same time, the fluid pressure acts on the push rod, to thereby generate, in the push rod, a thrust force acting in the direction opposite to that of the movement of the piston pressed by the clutch member. In the present invention, the push rod comprises two separate bodies, namely, the front body portion threadably engaged with the clutch member and the rear body portion engaged with the cam rod. Therefore, a clearance is formed between the parting surfaces of the front body portion and the rear body portion, and the thrust force of the rear body portion acting in the direction opposite to the location of the disc can be separated from the thrust force of the front body portion acting in the direction of the disc. Therefore, there is no possibility that the fluid pressure acting on the push rod will reduce an output force of the piston and limit generation of an output force of the piston relative to the operation of the brake pedal. Therefore, there is no need to increase a piston diameter in consideration of a loss of an output force of a piston, and a reduction in size of a disc brake can be achieved.

What is claimed is:

1. A disc brake comprising:
   a pair of pads disposed on opposite sides of a disc;
   a caliper including a cylinder having one end closed and a piston slidably fitted within the cylinder, the piston being adapted to be slidably moved, to thereby bring the pair of pads into contact with the disc;
   a cam mechanism adapted to be rotated to thereby change an amount of projection of a cam rod;
   a push rod disposed within the cylinder, which is adapted to be pressed and moved by the cam rod;
   a clutch member disposed within the cylinder, which abuts against the piston while being threadably engaged with the push rod, the clutch member being adapted to be pressed by the push rod, to thereby positively perform a slidable movement of the piston relative to the cylinder;
   a push rod biasing member disposed within the cylinder so as to bias the push rod towards the cam mechanism; and
   a spring cover disposed within the cylinder, the push rod biasing member being held between the push rod and the spring cover,
   wherein the push rod, the push rod biasing member and the spring cover form an assembly in the form of a single cartridge, the push rod comprising a front body portion threadably engaged with the clutch member and a rear body portion engaged with the cam rod, the front body portion and the rear body portion being separable from each other, with parting surfaces thereof existing in the interior of the cartridge,
   a radially outer portion of the front body portion of the push rod including a rotation-preventing portion, the rotation-preventing portion being adapted to restrict rotation of the front body portion and the cylinder relative to each other in a circumferential direction of the cylinder.

2. A disc brake according to claim 1, wherein the spring cover includes a bent portion for defining an axial length of the push rod biasing member when the spring cover, the push rod and the push rod biasing member are formed into the cartridge, the bent portion being bent at a position such that the push rod biasing member has a preset length shorter than a free length of the push rod biasing member.

3. A disc brake according to claim 2, wherein when the cartridge is assembled to the cylinder, the bent portion of the spring cover is disposed at a position separate from a bottom surface of the cylinder, the cam rod pressing against the push rod so that the push rod biasing member has a length shorter than the preset length.

4. A disc brake according to claim 1, wherein the rotation-preventing portion of the front body portion of the push rod comprises a rotation-preventing projection which projects radially outward, and a rotation-preventing recess which fittingly receives the rotation-preventing projection is formed in an inner circumferential surface of the cylinder, rotation of the front body portion and the cylinder relative to each other in the circumferential direction of the cylinder being restricted by abutment between the rotation-preventing projection and the rotation-preventing recess.

5. A disc brake according to claim 4, wherein the rotation-preventing projection has a semicircular cross-section taken in a direction perpendicular to the axis of the front body portion and has a curved surface for abutment against the rotation-preventing recess, while the rotation-preventing recess has a semicircular cross-section taken in a direction perpendicular to the axis of the cylinder and has a curved surface for abutment against the rotation-preventing projection, the abutment between the rotation-preventing projection and the rotation-preventing recess being effected by the curved surfaces.

6. A disc brake according to claim 4, wherein the spring cover comprises a ring-shaped portion through which the clutch member is inserted, a cylindrical portion axially extending in one direction from a radially outer end portion of the ring-shaped portion and a plurality of extended portions further extending in the one direction from the cylindrical portion, the rotation-preventing projection constantly fitting between the extended portions disposed adjacent to each other by a length equal to or more than ⅓ the thickness of the rotation-preventing projection in an axial direction of the cartridge.

7. A disc brake according to claim 5, wherein the spring cover comprises a ring-shaped portion through which the clutch member is inserted, a cylindrical portion axially extending in one direction from a radially outer end portion of the ring-shaped portion and a plurality of extended portions further extending in the one direction from the cylindrical portion, the rotation-preventing projection constantly fitting between the extended portions disposed adjacent to each other by a length equal to or more than ⅓ the thickness of the rotation-preventing projection in an axial direction of the cartridge.

8. A disc brake according to claim 6, wherein a distal end portion of each extended portion includes a bent portion which is bent radially inward and engaged with the rear body portion and reference portions adjacently provided on opposite sides of the bent portion, distal end faces of the reference portions and a distal end face of the bent portion being coincident with each other in terms of position in the axial direction of the cartridge.

9. A disc brake according to claim 7, wherein a distal end portion of each extended portion includes a bent portion which is bent radially inward and engaged with the rear body portion and reference portions adjacently provided on opposite sides of the bent portion, distal end faces of the reference portions and a distal end face of the bent portion being coincident with each other in terms of position in the axial direction of the cartridge.

* * * * *